Figure 1:
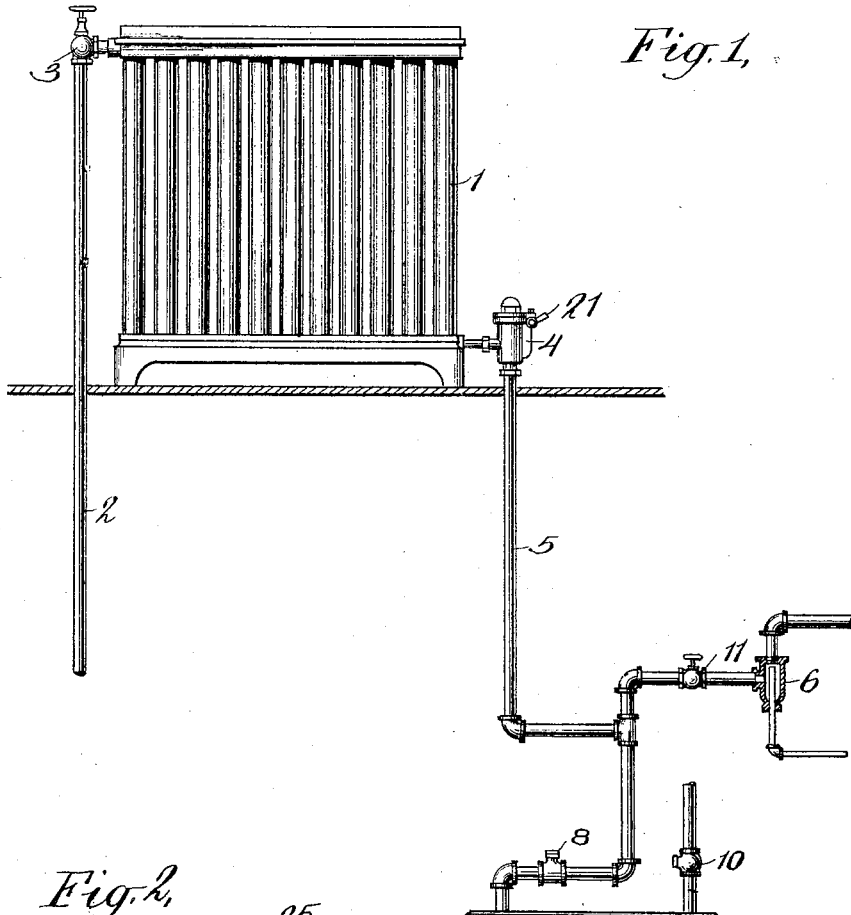

No. 771,745. PATENTED OCT. 4, 1904.
A. G. PAUL.
HEATING SYSTEM.
APPLICATION FILED MAR. 18, 1904.
NO MODEL. 5 SHEETS—SHEET 1.

WITNESSES:
Edward F. Daly
Geo. M. Harris

INVENTOR
Andrew G. Paul
BY
Kenyon & Kenyon
ATTORNEYS

No. 771,745. PATENTED OCT. 4, 1904.
A. G. PAUL.
HEATING SYSTEM.
APPLICATION FILED MAR. 18, 1904.
NO MODEL. 5 SHEETS—SHEET 2.

WITNESSES:
Edward F. Daly
Geo. M. Harris

INVENTOR
Andrew G. Paul
BY
Kenyon & Kenyon
ATTORNEYS

No. 771,745. PATENTED OCT. 4, 1904.
A. G. PAUL.
HEATING SYSTEM.
APPLICATION FILED MAR. 18, 1904.
NO MODEL. 6 SHEETS—SHEET 3.

WITNESSES:
Edward F. Daly
Geo. M. Harris

INVENTOR
Andrew G. Paul
BY
Kenyon & Kenyon
ATTORNEYS

No. 771,745. PATENTED OCT. 4, 1904.
A. G. PAUL.
HEATING SYSTEM.
APPLICATION FILED MAR. 18, 1904.
NO MODEL. 5 SHEETS—SHEET 4.
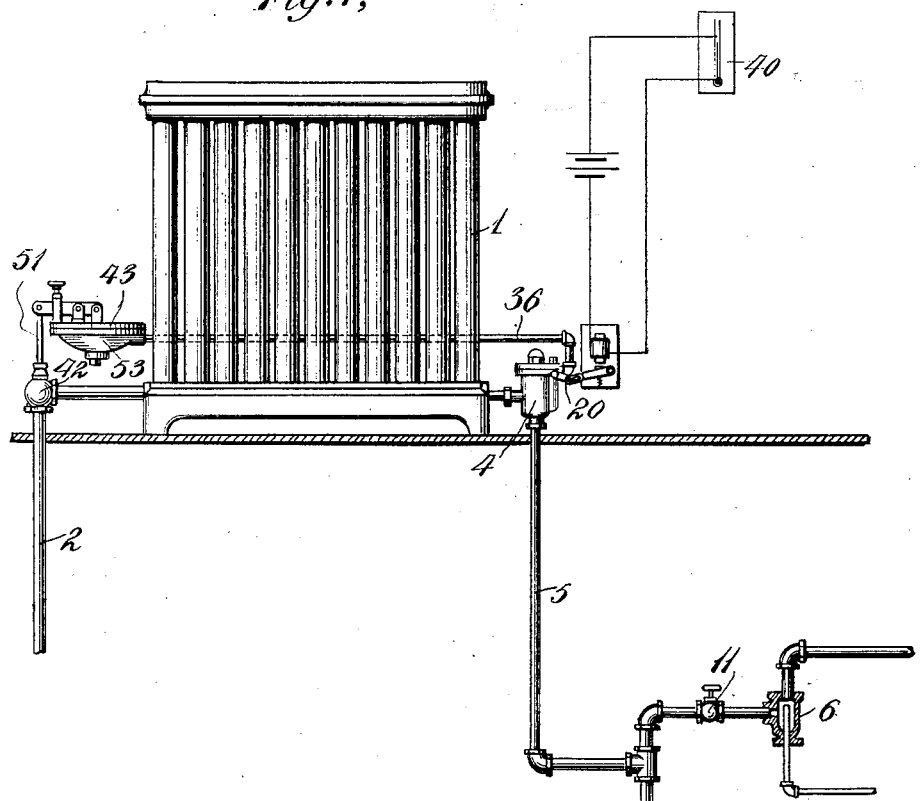
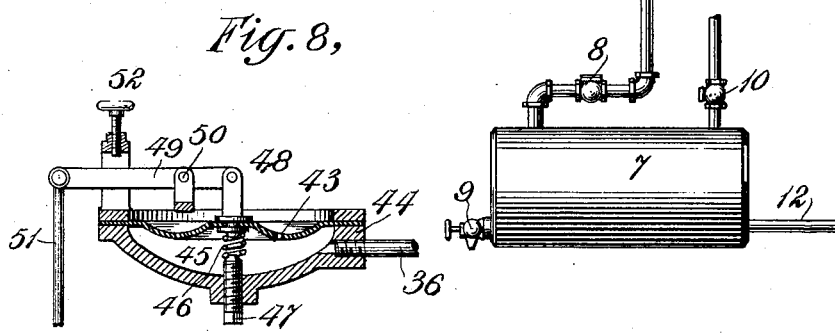
WITNESSES: Edward F Daly, Geo. M. Harris.
INVENTOR Andrew G. Paul
BY Kenyon & Kenyon
ATTORNEYS No. 771,745. PATENTED OCT. 4, 1904.
A. G. PAUL.
HEATING SYSTEM.
APPLICATION FILED MAR. 18, 1904.
NO MODEL. 5 SHEETS—SHEET 5.
Fig. 9,
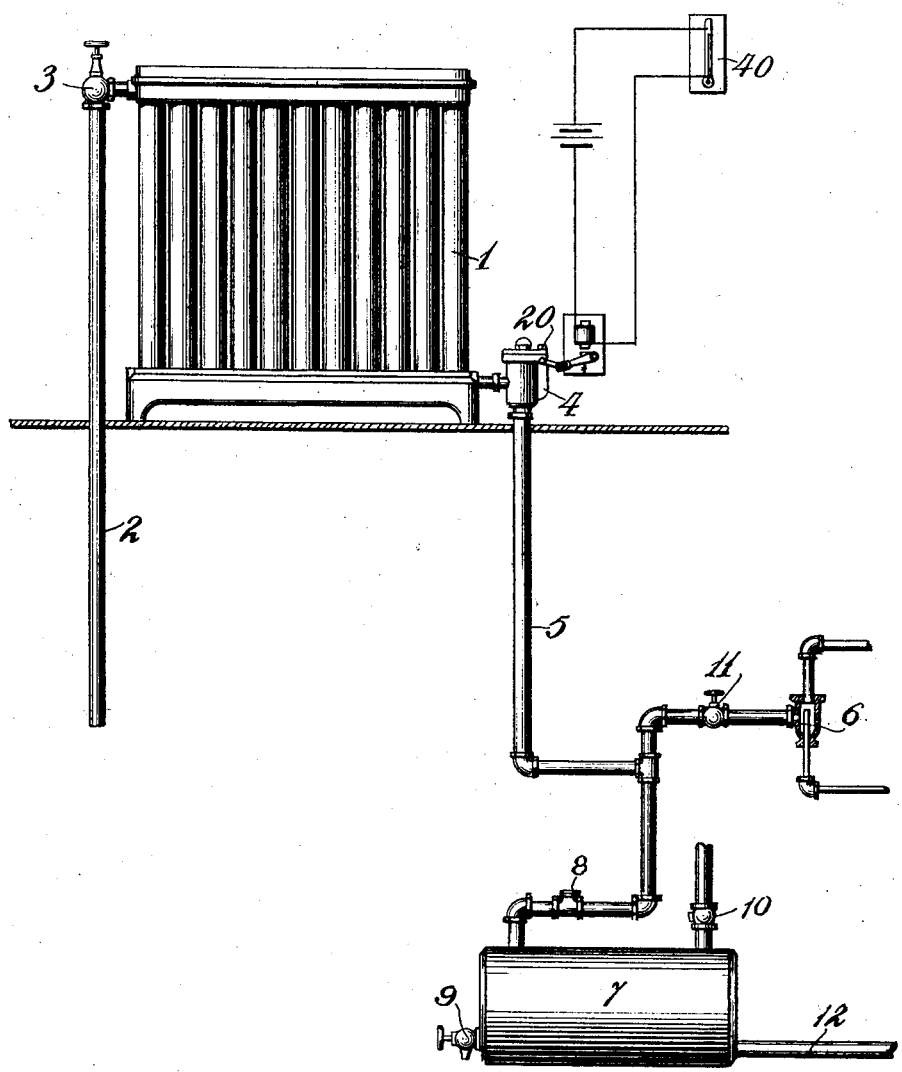
WITNESSES:
Edward F. Daly
Geo. M. Harris
INVENTOR
Andrew G. Paul
BY
Kenyon & Kenyon
ATTORNEYS No. 771,745.

Patented October 4, 1904.

UNITED STATES PATENT OFFICE.

ANDREW G. PAUL, OF BOSTON, MASSACHUSETTS.

HEATING SYSTEM.

SPECIFICATION forming part of Letters Patent No. 771,745, dated October 4, 1904.

Application filed March 18, 1904. Serial No. 198,737. (No model.)

*To all whom it may concern:*

Be it known that I, ANDREW G. PAUL, a citizen of the United States, residing in Boston, in the county of Suffolk and State of Massachusetts, have invented a new and useful Improvement in Heating Systems, of which the following is a full, clear, and exact specification, reference being had to the accompanying drawings, which form a part hereof.

This invention relates to a heating system wherein steam or other suitable heating agent is circulated for the purpose of conveying and imparting heat to the places desired; and it consists in an improved construction and arrangement of the parts of such a system.

The object of my invention is to control the discharge of the air and the water of condensation from the radiator and also in addition to this to control the supply of the heating vehicle thereto, and at the same time to prevent the loss or waste of the heating vehicle through the discharge-pipe.

My invention consists, first, in the combination, in a heating system, of a supply-pipe, a heater or radiator, and a discharge-pipe, and a valve device in the discharge-pipe having a suitable valve-casing provided with a port for the discharge of the water, and a piston or fluid-pressure motor controlling said port, the valve-casing being provided with a fluid-pressure chamber on one side of said motor, and a passage for air or gas or vapor connecting the fluid-pressure chamber with the system on the inlet side of said motor and adapted to be controlled by the collection of the water of condensation, and an exhausting device which is connected with the fluid-pressure chamber.

My invention also consists in combining with the parts above enumerated a valve device on the supply-pipe having a suitable valve-casing, a supply-port, a piston or fluid-pressure motor controlling said supply-port, a fluid-pressure chamber on one side of said piston, an equalizing-passage connecting the chambers on opposite sides of said piston and an exhausting device connected with said fluid-pressure chamber.

In the best form of my invention the fluid-pressure chamber of the supply-valve is connected, by means of a suitable pipe, with the discharge-pipe, so that the piston which is connected with the supply-valve is operated by the exhauster connected with the discharge-pipe. I also employ some means for shutting off or closing said connecting-pipe when desired.

My invention also consists in employing a thermostat to control the passage leading from the fluid-pressure chamber of the discharge-valve to the exhausting device or to control the passage leading from the fluid-pressure chamber of the supply-valve to the exhausting device or to control both of these passages, whereby the operation of the system can be determined and regulated by the temperature of the apartment which is being heated or by the heat which is being given off by the radiator.

My invention also consists in other features of construction and combinations of parts hereinafter described and claimed.

My invention is fully shown in the accompanying drawings, in which—

Figure 2:
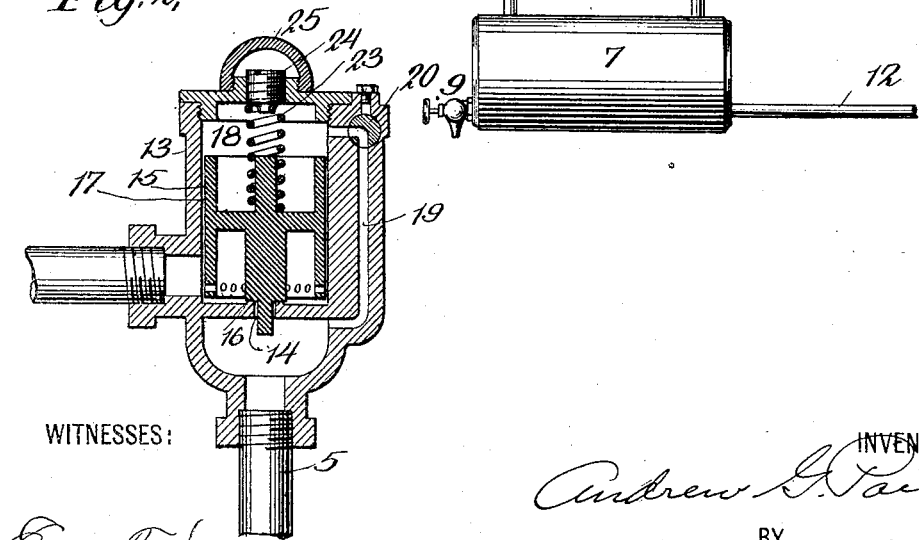
Figure 3:
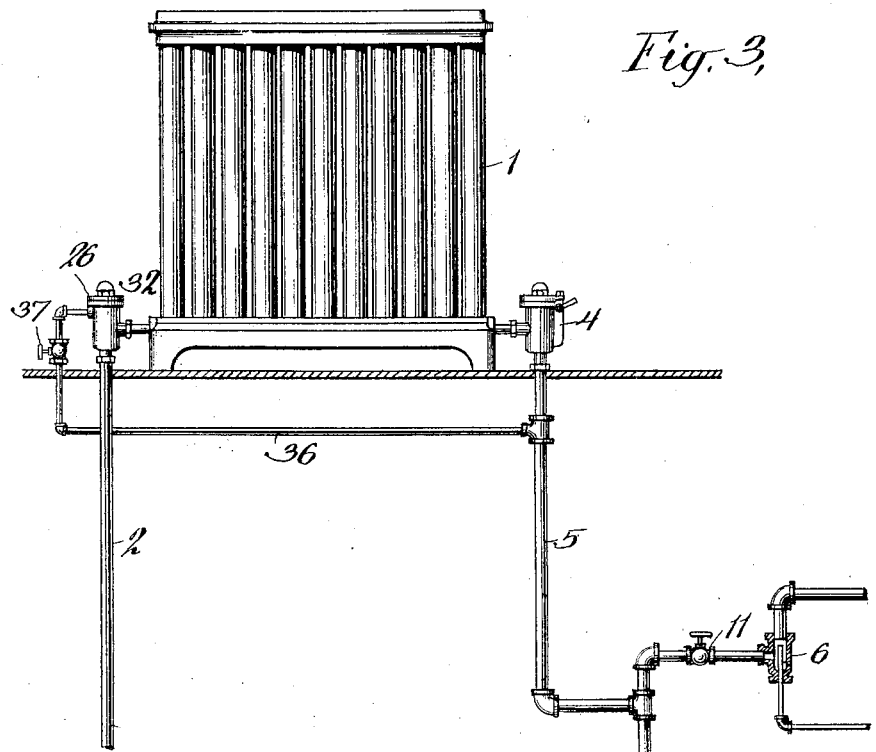
Figure 4:
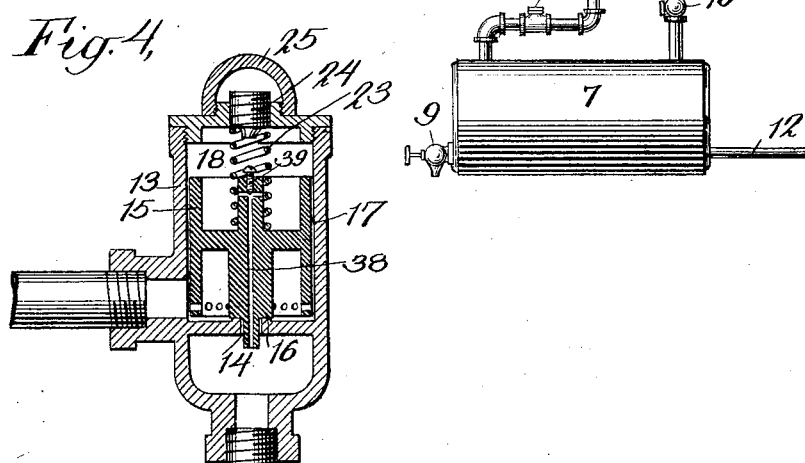
Figure 5:
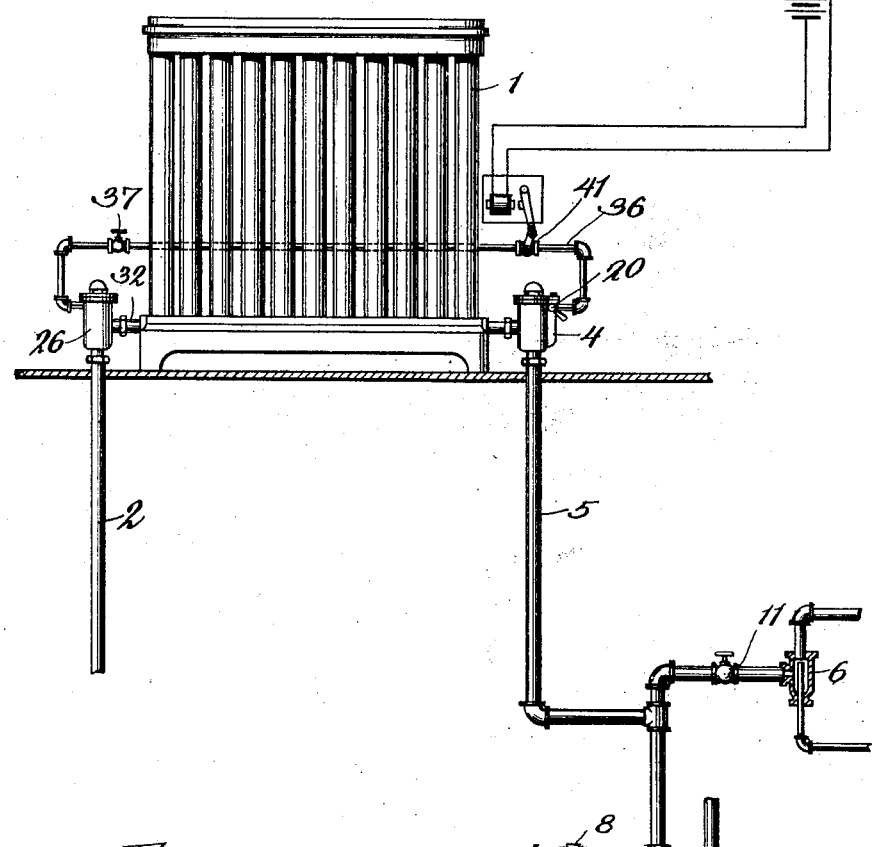
Figure 6:
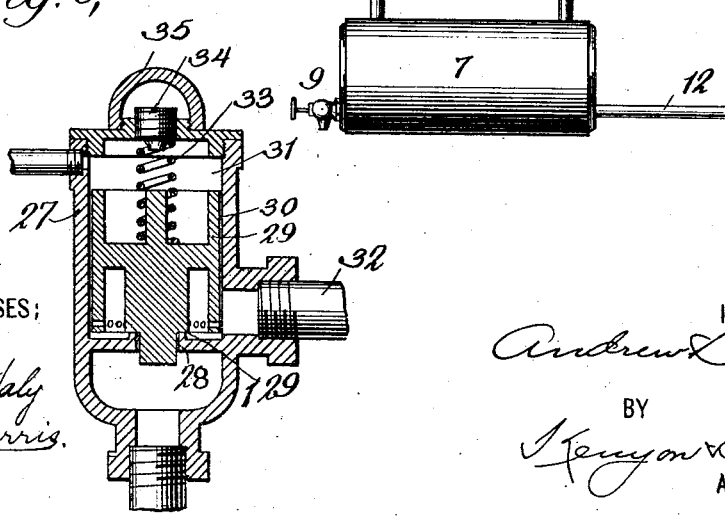

Figure 1 shows one form of system with my improved discharge-valve on the discharge-pipe. Fig. 2 is a sectional view showing the construction of said discharge-valve. Fig. 3 shows another form of my invention in which my improved discharge-valve is used on the return or discharge pipe and my improved form of supply-valve is used on the supply-pipe and the fluid-pressure chamber of the supply-valve is connected with the discharge-pipe. Fig. 4 is a sectional view showing another form or modification of my discharge-valve. Fig. 5 shows a form of my system in which the pipe connecting the fluid-pressure chamber of the supply-valve with the discharge-pipe is controlled by means of a thermostat hung upon the wall of the room or in any suitable place. Fig. 6 is a sectional view of the valve used upon the supply-pipe. Fig. 7 shows another form of my invention in which the supply-valve is controlled by a diaphragm and in which the pipe or passage connecting both fluid-pressure chambers with the discharge-pipe is controlled by a thermostat upon the wall of the room. Fig. 8 is a sectional view of the diaphragm controlling the supply-valve. Fig. 9 shows another form of my invention in which the passage connecting the fluid-pressure chamber of the discharge-valve with the discharge-pipe is controlled by a thermostat upon the wall.

Similar numbers denote similar parts in the different figures.

Referring to Fig. 1, 1 is a heater or radiator. 2 is a supply-pipe provided with any suitable form of supply-valve 3. 4 is a valve device on the discharge-pipe. 5 is the return or discharge pipe. 6 is an exhauster in the form of a steam-jet connected with the discharge-pipe, as shown. 7 is a tank or reservoir to receive the water of condensation. 8 is a check-valve placed in the discharge-pipe above the tank or reservoir. 9 is a cock to draw the water from the reservoir whenever desired. 10 is a check-valve opening outward, so that if there is any pressure in the tank 7 it may blow out through this pipe. 11 is an ordinary valve by means of which the exhauster may be cut out of operation. 12 is a pipe leading from the tank or reservoir through which the water may be pumped to the boiler or to any other point desired.

The construction of the discharge-valve is shown in Fig. 2. 13 is the valve-casing. This valve-casing is provided with a port 14 at its lower end for the discharge of the water. 15 is a piston or pressure-motor adapted to move up and down in said casing and provided at its lower end with a valve 16, adapted to close the port 14. The piston 15 is made slightly smaller than the interior of casing 13, so as to form or leave a passage 17 for air or gas or even a small quantity of vapor between the piston and the wall of the casing. 18 is a fluid-pressure chamber above the piston. The passage 17 connects the fluid-pressure chamber 18 with the lower portion of the casing below the piston. 19 is a passage in the casing connecting the fluid-pressure chamber with the discharge-pipe 5 beyond the valve device. In the particular form of discharge-valve shown this passage 19 opens into a chamber in the lower part of the casing, which is on the discharge side of the water-discharge port. 20 is a two-way valve in the passage 19, which is provided with the handle 21. (See Fig. 1.) By turning the cock 20 the passage 19 can be connected with the fluid-pressure chamber 18 or cut off from said fluid-pressure chamber. 23 is a spring, one end of which bears against the upper side of the piston and the other end of which bears against the lower surface of a screw 24. The screw 24 is provided with a screw-thread taking in a screw-thread in the upper part of the casing. By screwing the screw 24 in or out the tension of the spring 23 can be varied and adjusted. 25 is a cap adapted to be screwed onto the top of the casing, as shown, and to cover and protect the screw 24.

The operation of this form of my invention is as follows: When any air or gas collects in the pipe leading from the radiator to the discharge-valve, it is drawn out by the operation of the exhauster through the passage 17, the fluid-pressure chamber 18, and the pipe or passage 19 and the discharge-pipe 5 without causing any motion of the piston 15. When, however, any substantial quantity of water collects in the lower part of the valve device, this water operates to seal the passage 17, as a result of which the exhauster produces a minus pressure or vacuum in the fluid-pressure chamber 18, which causes the piston 15 to be lifted, thereby opening the water-discharge port 14 and causing the discharge of the water or of water together with air or gas. As soon as the water has been discharged the piston again closes. This operation is repeated from time to time, air or gas and water being discharged intermittently, as already described. At the same time no substantial quantity of steam is permitted to escape around the piston 15.

By shutting off the pipe 19 by means of the cock 20 the discharge-valve will be closed and kept closed, so that neither air nor gas nor water will be drawn out from the system. It will be seen, therefore, that in the construction just explained there is a return for the air and water of condensation leading from the radiator, and a valve interposed between the outlet of the radiating device and the return, and a pressure-motor for operating said valve interposed between the valve and the outlet of the radiating device, and that the opposite sides of this motor are acted upon, respectively, by the pressure in the radiator-outlet and in the return, and that the pressure on the outer side of said motor—that is to say, the side away from the radiator-outlet—is controlled by the conditions on the inlet side of the valve, the controlling condition in the particular case in question being the accumulation of the water of condensation.

Referring to Figs. 3 and 6, the parts of the system are as already described, with the following additions: 26 is a valve on the supply-pipe, which is constructed as shown in section in Fig. 6. 27 is a suitable casing provided with a supply-port 28 at its lower end. 29 is a piston or fluid-pressure motor, which is made somewhat smaller than the casing, so as to form an equalizing-passage 30 between the piston and the wall of the casing. This piston carries the valve 129 at its lower end. 31 is a fluid-pressure chamber above the piston. 32 is the branch pipe leading from the supply-valve to the radiator. 33 is a spring bearing upon the upper end of the piston 30 and adapted to be regulated as to the tension by the screw 34, which screws into the top of the casing. 35 is a cap adapted to be screwed to the top of the casing, so as to cover and protect the screw 34. In Fig. 3, 36 is a pipe connecting the fluid-pressure chamber of the supply-valve with the discharge-pipe 5. This pipe is provided with a shut-off valve 37.

The operation of the form of system shown in Figs. 3 and 6 is as already explained so far as the discharge of water and air or gas through the discharge-valve is concerned. The exhauster connected with the discharge-pipe acting through the pipe 36 produces a vacuum or minus pressure in the fluid-pressure chamber of the supply-valve and causes the piston 29 to rise, and thus open the supply-port 28. When it is desirable to shut off the radiator, the valve 37 is closed, as a result of which the exhauster is no longer connected with the fluid-pressure chamber 31, and the pressure in the fluid-pressure chamber 31 is quickly equalized with the pressure in the supply-pipe underneath the piston by the passage of steam or vapor through the equalizing-passage 30. As soon as these pressures are equalized the valve closes. Meanwhile the air or gas and water are discharged intermittently through the valve 4, as already explained. If desired, a separate exhauster can be connected with the fluid-pressure chamber of the supply-valve by means of a suitable connecting-pipe; but I prefer to use the exhauster connected with the discharge-pipe.

In Fig. 4 a modification of the discharge-valve is shown, in which the passage connecting the fluid-pressure chamber with the discharge-pipe is formed in the middle of the piston itself (see 38) instead of being formed in the side of the casing, as in the form shown in Fig. 2. 39 is a screw in the upper part of the piston by means of which the size of the passage 38 can be varied or regulated.

Referring to Fig. 5, the parts shown therein are constructed as already described, including the supply-valve on the supply-pipe, such as is shown in section in Fig. 6, and a discharge-valve on the discharge-pipe, such as is shown in section in Fig. 2. The pipe 36, instead of being connected with the discharge-pipe 5 below the discharge-valve, is connected with the passage 19 of the discharge-valve at its upper end above the valve 20. 40 is a thermostat hung upon the wall of the room or at any suitable point and constructed in the usual manner and adapted, by means of an electric circuit and battery and electromagnet, as shown, to open and close the valve 41 in the pipe 36. When the heat of the room reaches the desired point, the circuit is closed, and the valve 41 is thereby closed, as a result of which the supply-valve is shut, thus preventing the admission of any more steam to the radiator. By shutting the valve 20 both the supply-valve and return-valves are closed.

Referring to Figs. 7 and 8, the parts shown therein are as already described, except that the supply-valve 42 is controlled by a diaphragm 43, which is supported in a suitable frame or casing 44, provided with a fluid-pressure chamber 45. Pipe 36 connects with this fluid-pressure chamber. The diaphragm is pressed upwardly by means of a spring 46, the tension of which can be regulated by a screw 47. 48 is an arm attached to the diaphragm 43 and pivoted to the lever 49. The lever 49 is pivotally supported at 50 by an arm projecting from the casing. The other end of the lever is connected with a rod 51, which carries the supply-valve at its lower end. 52 is a screw adapted to limit the motion of the lever 49 or to force the lever down, so as to close the valve when desired. 43 is a small vent leading into the fluid-pressure chamber 45, by means of which the atmospheric pressure is admitted to that chamber when the connection with the exhauster is shut off.

In the system just explained when the room becomes sufficiently heated the thermostat closes the valve 20, shutting off the exhauster from both fluid-pressure chambers. As a result of this both the supply-valve and the return-valve are closed. When the temperature of the room falls below the desired point, valve 20 is opened, and the exhauster operates to open the supply-valve and also to remove air or gas and water, as already explained, intermittently through the return-valve.

In Fig. 9 a system is shown in which an ordinary valve is used upon the supply-pipe, and the passage 19 of the discharge-valve is operated by a thermostat on the wall of the room.

Some of the advantages secured by my improved system are as follows: The water and air or gas are intermittently and positively removed from the radiator or heater whenever they collect in any considerable quantity at the discharge-valve. This is done not only efficiently, but economically. The construction of the discharge-valve is simple and not liable to get out of order. When the supply-valve is employed in combination with the discharge-valve, the supply of steam to the radiator is easily controlled and regulated. By employing a thermostat to control the pipes and passage leading to the exhausting apparatus the operation of the system is accurately adjusted in reference to the temperatures which are desired in the rooms being heated, and economy is secured in the amount of the heating-vehicle employed.

What I claim as new, and desire to secure by Letters Patent, is—

1. In a heating system, the combination of a supply-pipe, a heater or radiator, a discharge-pipe, a valve device in said discharge-pipe having a suitable valve-casing, provided with a port for the discharge of the water, a fluid-pressure motor controlling said port, the valve-casing being provided with a fluid-pressure chamber on one side of said motor, a passage connecting the fluid-pressure chamber with the system on the inlet side of said motor and adapted to be controlled by the collection of the water of condensation, and an exhausting device in communication with the fluid-pressure chamber, substantially as set forth.

2. In a heating system, the combination of a supply-pipe, a heater or radiator, a discharge-pipe, a valve device in said discharge-pipe having a suitable valve-casing provided with a port for the discharge of the water, a piston controlling said port, the valve-casing being provided with a fluid-pressure chamber above said piston, the valve device being provided with a passage between the piston and the wall of the casing adapted to be sealed by an accumulation of water of condensation, and an exhausting device in communication with the fluid-pressure chamber, substantially as set forth.

3. In a heating system, the combination of a supply-pipe, a heater or radiator, a discharge-pipe, a valve device in said discharge-pipe having a suitable valve-casing provided with a port for the discharge of the water, a fluid-pressure motor controlling said port, the valve-casing being provided with a fluid-pressure chamber on one side of said motor and with a second chamber on the other side of said motor, a passage connecting the fluid-pressure chamber with the chamber on the other side of the motor and adapted to be controlled by an accumulation of water of condensation, an exhausting device in communication with the fluid-pressure chamber, and a spring adapted to move the motor so as to close the discharge-port for the water, substantially as set forth.

4. In a heating system, the combination of a supply-pipe, a heater or radiator, a discharge-pipe, a valve device in said discharge-pipe having a suitable valve-casing provided with a port for the discharge of the water, a fluid-pressure motor controlling said port, the valve-casing being provided with a fluid-pressure chamber on one side of said motor, and with a second chamber on the other side of said motor, a passage connecting the fluid-pressure chamber with the chamber on the other side of the motor and adapted to be controlled by an accumulation of water of condensation, an exhausting device in communication with the fluid-pressure chamber, and a spring adapted to move the motor so as to close the discharge-port for the water, and means to regulate the tension of the spring, substantially as set forth.

5. In a heating system, the combination of a supply-pipe, a heater or radiator, a discharge-pipe, a valve device in said discharge-pipe having a suitable valve-casing provided with a port for the discharge of the water, a fluid-pressure motor controlling said port, the valve-casing being provided with a fluid-pressure chamber on one side of said motor, a passage connecting the fluid-pressure chamber with the system on the inlet side of said motor and adapted to be controlled by the collection of the water of condensation, a passage connecting the fluid-pressure chamber with the discharge-pipe beyond the valve device, and an exhausting device connected with the discharge-pipe, substantially as set forth.

6. In a heating system, the combination of a supply-pipe, a heater or radiator, a discharge-pipe, a valve device in said discharge-pipe having a suitable valve-casing and provided with a port for the discharge of the water, a fluid-pressure motor controlling said port, the valve-casing being provided with a fluid-pressure chamber on one side of said motor, and with a second chamber on the other side of said motor, the valve device being provided with a passage connecting the fluid-pressure chamber with the chamber on the other side of the motor and adapted to be sealed by an accumulation of water of condensation, and a passage connecting the fluid-pressure chamber with the discharge-pipe beyond the valve device, a cock on said passage, and an exhausting device connected with the discharge-pipe, substantially as set forth.

7. In a heating system, the combination of a supply-pipe, a heater or radiator, a discharge-pipe, a valve device in said discharge-pipe having a suitable valve-casing provided with a port for the discharge of the water, a fluid-pressure motor controlling said port, the valve-casing being provided with a fluid-pressure chamber on one side of said motor, a passage connecting the fluid-pressure chamber with the system on the inlet side of said motor and adapted to be controlled by the collection of the water of condensation, an exhausting device in communication with the fluid-pressure chamber, a valve device on the supply-pipe having a suitable valve-casing provided with a supply-port, a fluid-pressure motor controlling said supply-port, the valve-casing being provided with a fluid-pressure chamber on one side of said motor, an equalizing-passage connecting the chambers on the opposite sides of said motor, and an exhausting device in communication with said fluid-pressure chamber, substantially as set forth.

8. In a heating system, the combination of a supply-pipe, a heater or radiator, a discharge-pipe, a valve device in said discharge-pipe having a suitable valve-casing provided with a port for the discharge of the water, a fluid-pressure motor controlling said port, the valve-casing being provided with a fluid-pressure chamber on one side of said motor, a passage connecting the fluid-pressure chamber with the system on the inlet side of said motor, and adapted to be controlled by the collection of the water of condensation, a passage connecting the fluid-pressure chamber with the discharge-pipe beyond the valve device, an exhausting device connected with the discharge-pipe, a valve device in the supply-pipe having a fluid-pressure motor controlling the supply-port and having a fluid-pressure chamber on one side of said motor, a pipe connecting said fluid-pressure chamber with the discharge-pipe, means for closing said connecting-pipe and an equalizing-passage for equalizing the pressures on the opposite sides of said motor, substantially as set forth.

9. In a heating system, the combination of a supply-pipe, a heater or radiator, a discharge-pipe, a valve device in said discharge-pipe having a suitable valve-casing provided with a port for the discharge of the water, a fluid-pressure motor controlling said port, the valve-casing being provided with a fluid-pressure chamber on one side of said motor, a passage connecting the fluid-pressure chamber with the system on the inlet side of said motor, and adapted to be controlled by the collection of the water of condensation, an exhausting device, a pipe connecting the exhausting-pipe with the fluid-pressure chamber, and a thermostat adapted to control said connecting-pipe, substantially as set forth.

10. In a heating system, the combination of a supply-pipe, a heater or radiator, a discharge-pipe, a valve device in the said discharge-pipe having a suitable valve-casing provided with a port for the discharge of the water, a fluid-pressure motor controlling said port, the valve-casing being provided with a fluid-pressure chamber on one side of said motor, a passage connecting the fluid-pressure chamber with the system on the inlet side of said motor and adapted to be controlled by the collection of the water of condensation, an exhausting device connected with the fluid-pressure chamber, a valve device on the supply-pipe having a suitable valve-casing provided with a supply-port, a fluid-pressure motor controlling said supply-port, the valve-casing being provided with a fluid-pressure chamber on one side of said motor, an equalizing-passage connecting the chambers on opposite sides of said motor, an exhausting device in communication with said fluid-pressure chamber, and a thermostat adapted to control the connections between the exhausting device or devices and the fluid-pressure chambers, substantially as set forth.

11. In a heating system, the combination of a supply-pipe, a heater or radiator, a discharge-pipe, a valve device in said discharge-pipe having a suitable valve-casing provided with a port for the discharge of the water, a fluid-pressure motor controlling said port, the valve-casing being provided with a fluid-pressure chamber on one side of said motor, a passage connecting the fluid-pressure chamber with the system on the inlet side of said motor, and adapted to be sealed by an accumulation of water of condensation, a passage connecting the fluid-pressure chamber with the discharge-pipe beyond the valve device, a valve on the supply-pipe having a suitable valve-casing provided with a supply-port, a fluid-pressure motor controlling said supply-port, the valve-casing being provided with a fluid-pressure chamber on one side of said motor, an equalizing-passage connecting the chambers on opposite sides of said motor, a pipe connecting the fluid-pressure chamber of the supply-valve with the discharge-pipe, a valve controlling said pipe, a thermostat adapted to control said valve, and an exhauster connected with the discharge-pipe, substantially as set forth.

12. In a heating system, the combination of a radiating device, a discharge-pipe, a valve interposed between the outlet of the radiating device and the discharge-pipe, a pressure-motor for operating said valve, having its opposite sides acted upon respectively by the pressures in the radiator-outlet and the discharge-pipe, the pressure on the outer side of said motor being controlled by the conditions on the inlet side of the valve, and an exhausting device connected with the discharge-pipe, substantially as set forth.

13. In a heating system, the combination of a supply-pipe, a heater or radiator, a discharge-pipe, a valve device in said discharge-pipe having a suitable valve-casing provided with a port for the discharge of the water, a fluid-pressure motor controlling said port, the valve-casing being provided with a fluid-pressure chamber on the outer side of said motor, the inner side of said motor being exposed to pressure on the inlet side of the valve device, the valve device being provided with a passage connecting the fluid-pressure chamber with the inlet side of the device, the passage being automatically controlled by the conditions on the inlet side of said device to control the differential pressures acting on the motor, and an exhausting device in communication with the fluid-pressure chamber, substantially as set forth.

14. In a heating system, the combination of a supply-pipe, a heater or radiator, a discharge-pipe, a valve device in said discharge-pipe having a suitable valve-casing provided with a port for the discharge of the water, a fluid-pressure motor controlling said port, the valve-casing being provided with a fluid-pressure chamber on the outer side of said motor, the inner side of said motor being exposed to the pressure on the inlet side of the valve device, the valve device being provided with a passage connecting the fluid-pressure chamber with the inlet side of the device, the passage being automatically controlled by the accumulation of water of condensation, and an exhausting device in communication with the fluid-pressure chamber, substantially as set forth.

In testimony whereof I have signed my name to this specification in the presence of two subscribing witnesses.

ANDREW G. PAUL.

Witnesses:
ELLA G. BIRTWELL,
GEORGE D. WILDES.